United States Patent [19]

Gill, Jr. et al.

[11] 3,895,344

[45] July 15, 1975

[54] VEHICLE DETECTION SYSTEM AND METHOD OF OPERATION

[75] Inventors: Homer R. Gill, Jr., Champaign; Hans M. Ortlepp, Urbans, both of Ill.

[73] Assignee: The United States of America as represented by the Secretary of the Navy, Washington, D.C.

[22] Filed: Feb. 12, 1970

[21] Appl. No.: 10,943

[52] U.S. Cl. .............................................. 340/38 S
[51] Int. Cl. .............................................. G08g 1/00
[58] Field of Search......... 181/.5 R; 340/38 R, 38 S; 102/19.2

[56] References Cited
UNITED STATES PATENTS

| | | | |
|---|---|---|---|
| 1,788,182 | 1/1931 | Zierdt | 340/38 |
| 2,419,099 | 4/1947 | Wall | 340/38 S |
| 3,012,503 | 12/1961 | Brown | 102/19.2 X |
| 3,238,457 | 3/1966 | Boymel | 179/1 MN |
| 3,416,630 | 12/1968 | Pohl | 181/.5 R |

Primary Examiner—Ralph D. Blakeslee
Attorney, Agent, or Firm—R. S. Sciascia; Henry Hansen

[57] ABSTRACT

The specification discloses a vehicle detection system which operates to detect the presence of land vehicles by detecting and analyzing the acoustical spectrum therefrom. In particular, the system is arranged to eliminate false indications due to overflying aircraft by diminishing the sensitivity of the system for small signal-to-noise ratios and increasing the sensitivity up to a predetermined maximum for higher signal-to-noise ratios.

9 Claims, 2 Drawing Figures

PATENTED JUL 15 1975   3,895,344

INVENTORS
HOMER R. GILL, Jr.
HANS MAX ORTLEPP
BY 3,895,344

VEHICLE DETECTION SYSTEM AND METHOD OF OPERATION

The present invention relates to a method and apparatus for detecting land vehicles.

In certain instances it is desired reliably to detect the presence of land vehicles in certain regions and, in particular, to ascertain the presence of unauthorized vehicles. Such systems ordinarily employ an acoustical sensor, or preferably, series thereof distributed along the path, or near the path, which the vehicle will be most likely to follow. Such systems must be relatively sensitive and the microphonic type sensors employed are omnidirectional and, accordingly, false indications can be obtained from aircraft flying overhead.

A known type of vehicle detection system is one in which the detection criterion is the amplitude and rate of modulation of a line of the acoustic spectrum from the vehicle within that range of the spectrum having the highest energy. A land vehicle typically, but not always, develops a greater amplitude and a faster rate of frequency modulation on the lines of the acoustic spectrum than does an aircraft. In the known systems when the modulation is within certain characteristic frequency limits, a signal referred to as "dither" is generated which, at a certain predetermined threshold value, develops an output signal.

Known systems operating on the aforementioned principle, employ two timers, thereby establishing a certain time distribution to obtain information about velocity and location of the vehicle, thereby to avoid false output signals because of overflying aircraft. In brief, the timers referred to are enabled whenever the signal strength of the "dither" signal from the spectral line being examined exceeds a predetermined value.

The systems processing the received acoustical energy include a phase lock loop that locks on the line and, because of the use of two timers for establishing a minimum time period, the loop must lock on the line for a certain minimum time before an output signal can be generated.

A system of the nature referred to above, however, is unreliable and the use of timers results in the unrealistic processing of the acoustical information. The prime function of the timers is to eliminate false generation of output signals, such as those from overflying aircraft, but analysis of the situation shows that the majority of false output signals are not caused by overflying aircraft, but by the characteristics or behavior of the phase lock loop at low signal-to-noise ratios.

The present invention is predicated on the proposition that the use of timers and the like is not required to eliminate false output signals, but rather, the provision of circuitry that takes into account the aforementioned performance of the phase lock loop at low signal-to-noise ratios.

With the foregoing in mind, it will be evident that a primary objective of the present invention is the provision of an improved method and apparatus for monitoring an area, or region, for the purpose of detecting the presence of unauthorized ground vehicles in the area.

Another object of the present invention is the provision of a method and apparatus of the nature referred to which is relatively insensitive to aircraft flying over the region being monitored.

A still further object of the present invention is the provision of an improvement in ground vehicle detection systems which can be incorporated in existing systems, as well as in new systems.

These and other objects and advantages of the present invention will become more clearly apparent upon reference to the following detailed specification taken in connection with the accompanying drawings in which:

FIG. 1 illustrates in block diagram, an improved detection system for ground or surface vehicles according to the present invention; and FIG. 2 is a graph showing related voltages in the system.

BRIEF SUMMARY OF THE INVENTION

The present invention primarily obtains an indication of the presence of a surface vehicle by scanning a given high energy line of the acoustical spectrum of the vehicle and producing an output signal in accordance with the frequency and amplitude of the modulation of the spectrum line being scanned, namely, in accordance with the value of the "dither" present on the line being scanned.

Furthermore, the system according to the present invention utilizes the aforementioned signal directly to produce an output signal in accordance with the instantaneous value of the signal, rather than the average thereof over a selected period of time as has been done heretofore.

More specifically, the present invention eliminates false ouptut signals by adjusting the threshold of energy at which such signals are developed. The adjustment of the threshold is effected by continuously monitoring the signal-to-noise ratio in the incoming acoustical signal. A voltage signal is developed in accordance with the signal-to-noise ratio and the threshold is adjusted for minimum sensitivity when the ratio is low and for maximum sensitivity when the ratio is high.

DETAILED DESCRIPTION OF THE INVENTION

Figure 1:
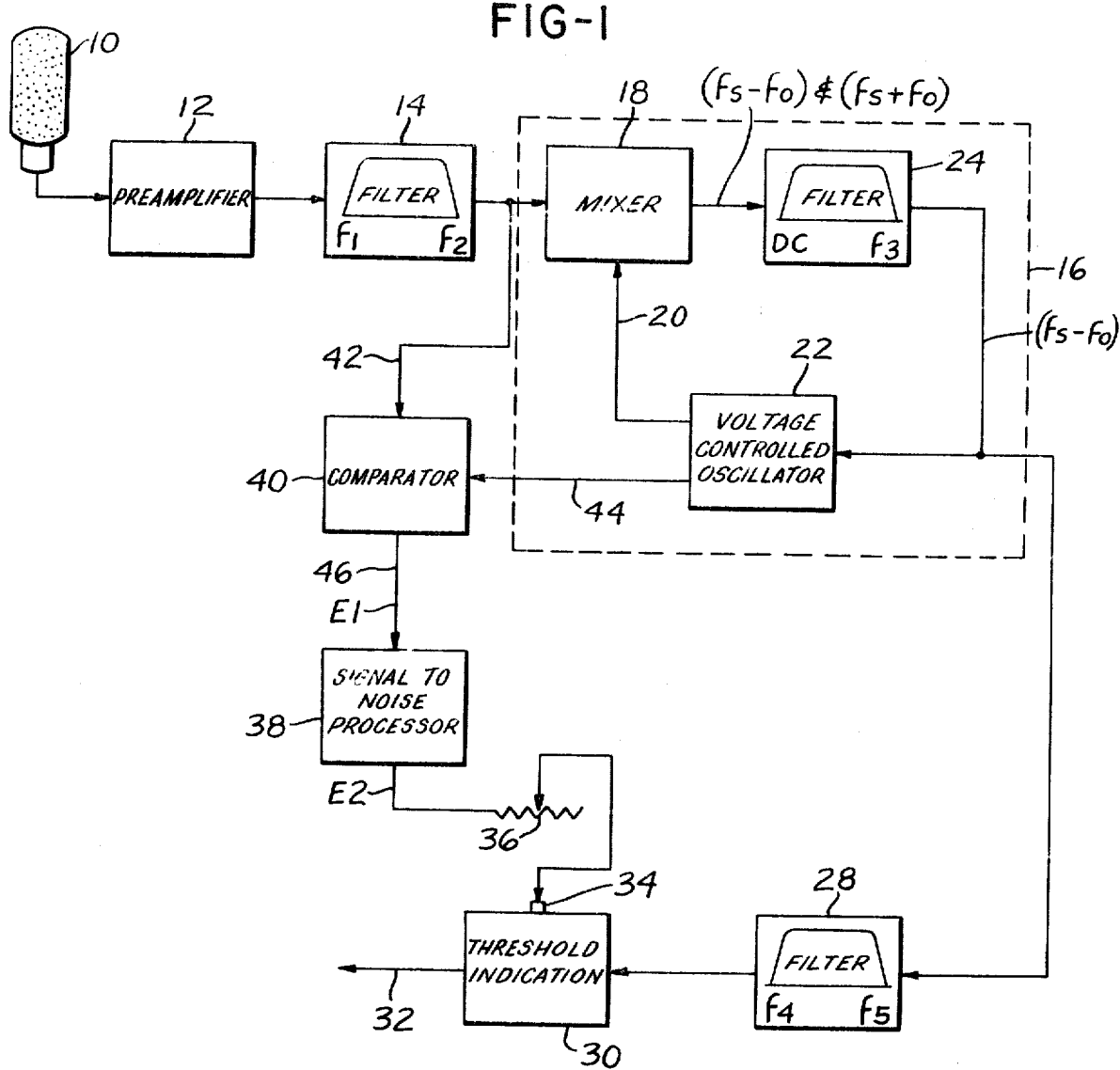

Referring to the drawings somewhat more in detail, in FIG. 1, a microphone pickup is indicated at 10. This is preferably an omnidirectional microphone device, thereby better to scan, or monitor, the adjacent region. The signal received by the microphone is processed, such as by passing it through a preamplifier 12 and a band pass filter 14 which permits only a certain range of frequencies of the acoustical spectrum to pass therethrough. This range, for surface vehicles, might be in the range from 50 to 150 hertz. Within this range are to be found the highest energy lines of the acoustical spectrum from ground vehicles.

The output from band pass filter 14 is supplied to a phase lock loop, indicated by the dot-dash outline 16. A typical phase lock loop is essentially an extremely narrow band pass filter, less than 3 hertz, for example.

In the phase lock loop shown, there is a mixer 18 receiving the output from band pass filter 14 and, furthermore, receiving an output via line 20 from a voltage controlled oscillator 22. The output from the voltage controlled oscillator 22 and the output from filter 14 are combined in mixer 18 and supplied to the input of a low pass filter 24, the output of which is coupled by line 26 back to the control terminal of oscillator 22.

Oscillator 22 is a known unit which oscillates at a frequency which varies directly as the voltage supplied to the control terminal thereof. The output from oscillator 22 is mixed with the incoming acoustic signal and produces a zero beat. The variations in the voltage supplied by line 26 to oscillator 22 will, thus, be seen to be porportional to the signal frequency.

In respect of a land vehicle, especially as opposed to an aircraft, due to variations in grade, irregularities in the surface, curves, driver response, and the like, highly characteristic deviations occur in the frequencies found in the acoustic spectrum of the vehicle.

These variations can be analyzed and will be found to produce characteristic variations in the voltage supply to the input terminal of oscillator 22 as it tracks a given spectral line. This voltage signal is also supplied to a band pass component 28, which removes the direct current component and high frequency ripple from the signal. The output of component 28 is the "dither" signal to be detected and it is supplied to a threshold component 30 so that if the signal meets the required characteristics, an output signal is supplied to line 32.

According to the present invention, component 30 has a control terminal 34 for controlling the sensitivity of the component. The sensitivity of threshold component 30 is varied in accordance with a voltage supplied to control terminal 34. Terminal 34 might, for example, control a bias voltage in component 30 which determines the level of an input signal at which an output signal occurs.

The voltage supplied to terminal 34 is derived from a potentiometer 36 which receives the output from a component 38. Component 38, in turn, is supplied from a component 40, which has a first input 42 connected to output side of band pass filter 14 and a second input 44 supplied from the oscillator 22. Component 40 compares the signals supplied to the inputs thereof and determines the signal-to-noise ratio in a known manner and supplies a voltage to its output line 46 which varies substantially directly as the signal-to-noise ratio. This voltage is processed in component 38 and provides a control voltage for component 30 which varies substantially directly as the incoming voltage from line 46 up to a certain point.

Figure 2:
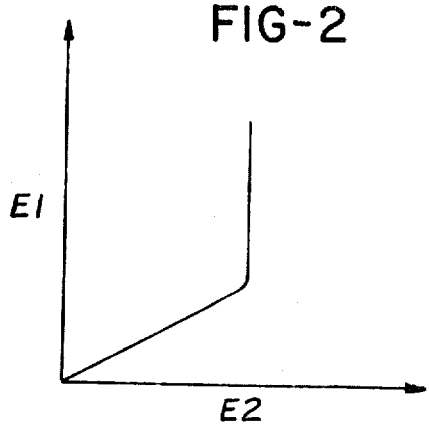

FIG. 2 shows the incoming voltage E1, to component 38 as the ordinate and the output voltage E2, from component 38 as the abscissa. It will be seen that for increasing voltage supply E1, to component 38, the output E2 varies up to a certain desired maximum amount and then levels off.

The supply of voltage E2, to control terminal 34 of threshold component 30 is utilized to decrease the sensitivity of component 30 for small signal-to-noise ratios and to increase sensitivity thereof as the signal-to-noise ratio increases.

The signal strength threshold adjustment is clamped at the adjustment representing the maximum desired degree of sensitivity of threshold component 30 because false indications will result if the detection threshold is too sensitive at high signal-to-noise ratio.

The present invention, as will now be perceived, enhances the reliability of a vehicle detection system by determining the signal-to-noise ratio and using a signal resulting therefrom to effect instantaneous adjustment of the threshold at which an output signal will result. Specifically, the sensitivity of the threshold component is decreased at low signal-to-noise ratios and increased up to a predetermined maximum sensitivity as the signal-to-noise ratio increases.

Modifications may be made falling within the scope of the appended claims.

What is claimed is:

1. A method of detecting a land vehicle which comprises: detecting the acoustic emanations from the vehicle, selecting a higher energy band from the acoustic spectrum of the said emanations, tracking a given spectral line of said selected band, mixing the first signal provided by the selected line with a second signal of substantially the same frequency to provide a zero beat third signal, varying the frequency of said second signal in conformity with variations in the voltage of said third signal, removing high frequency and direct current components from said third signal to form a fourth signal, developing an output signal at a predetermined frequency and amplitude of said fourth signal, measuring the signal-to-noise ratio in at least said selected band, and adjusting the level of at least the amplitude of said fourth signal at which an output signal will be developed in conformity with said ratio.

2. A method according to claim 1, in which the amplitude of said fourth signal which will develop an output signal is increased as said signal-to-noise ratio reduces and is reduced as said signal-to-noise ratio increases.

3. A method according to claim 2, in which the amplitude of the said fourth signal at which an output signal is produced is reduced to a predetermined minimum as said signal-to-noise ratio increases and then remains substantially constant during further increases in signal-to-noise ratio.

4. In a land vehicle detection system: means to detect and amplify a predetermined band width of the acoustical spectrum from a land vehicle, phase lock loop means for tracking a selected spectral line of said band width and operable to develop a voltage signal which varies in frequency and amplitude in conformity with the amplitude and frequency of variations in frequency of said selected spectral line, a threshold component connected to receive said voltage signal and operable to produce an output signal at a predetermined level of amplitude and frequency of said voltage signal, and means for adjusting said level in conformity to the signal-to-noise ratio in the said band width.

5. A land vehicle detection system according to claim 4, in which said level is adjusted downwardly for increases in said ratio and upwardly for decreases in said ratio.

6. A land vehicle detection system according to claim 5, in which said level is adjusted instantaneously and continuously during operation of said system.

7. A land vehicle detection system according to claim 5, which includes means for measuring the signal-to-noise ratio in said band width and for generating a control voltage which varies in conformity with said ratio, said threshold component having a control terminal sensitive to the supply of a voltage thereto to adjust the said level at which said threshold component produces an output signal, said control terminal being connected to receive said control voltage and reducing the said level as said signal-to-noise ratio increases and vice versa.

8. A land vehicle detection system according to claim 4, in which said means for detecting and amplifying a predetermined band width of the acoustical spectrum comprises: a microphone, an amplifier supplied by said microphone and a first band pass filter supplied by said amplifier and passing said predetermined band width, said phase lock loop means comprising a mixer receiving the output from said first band pass filter as a first input signal, a second band pass filter receiving the output from said mixer, a voltage controlled oscillator receiving the output from said second band pass filter as a control signal and developing an output signal having a frequency which varies according to variations in the voltage of the output from said second band pass filter, said mixer receiving the output from said oscillator as a second input signal, a third band pass filter receiving the output from said second band pass filter, a threshold component receiving the output from said third band pass filter as an input signal and operable at a predetermined level of said input signal to supply an output signal, means for measuring the signal-to-noise ratio in the said predetermined band width and for developing a control voltage which varies in conformity with said ratio, said threshold component having a terminal sensitive to the supply of voltage thereto to adjust the said level of the input signal thereto at which an output signal will be developed thereby, and means for supplying said control voltage to said terminal.

9. A land vehicle detection system according to claim 8, in which said level is adjusted downwardly as said ratio increases and upwardly as said ratio decreases.

* * * * *